United States Patent
Crary et al.

(10) Patent No.: US 9,657,420 B2
(45) Date of Patent: May 23, 2017

(54) SHEARED WOOL WEAVING METHOD

(71) Applicants: Nathan Crary, Portland, OR (US);
Zihao Dong, Shijiazhuang (CN)

(72) Inventors: Nathan Crary, Portland, OR (US);
Zihao Dong, Shijiazhuang (CN)

(73) Assignee: DECKERS OUTDOOR CORPORATION, Goleta, CA (US)

( * ) Notice: Subject to any disclaimer, the term of this patent is extended or adjusted under 35 U.S.C. 154(b) by 371 days.

(21) Appl. No.: 13/840,786

(22) Filed: Mar. 15, 2013

(65) Prior Publication Data

US 2013/0261785 A1    Oct. 3, 2013

Related U.S. Application Data

(60) Provisional application No. 61/680,608, filed on Aug. 7, 2012, provisional application No. 61/722,994, filed
(Continued)

(51) Int. Cl.

| | |
|---|---|
| *G06F 19/00* | (2011.01) |
| *D06C 11/00* | (2006.01) |
| *D06C 13/00* | (2006.01) |
| *D06B 1/00* | (2006.01) |
| *D01G 1/00* | (2006.01) |
| *D01G 15/00* | (2006.01) |
| *D01G 19/06* | (2006.01) |
| *D04B 1/16* | (2006.01) |

(Continued)

(52) U.S. Cl.
CPC .............. *D06C 11/00* (2013.01); *A43B 23/07* (2013.01); *B29D 35/142* (2013.01); *D01G 1/00* (2013.01); *D01G 15/00* (2013.01); *D01G 19/06* (2013.01); *D01G 21/00* (2013.01); *D04B 1/025* (2013.01); *D04B 1/04* (2013.01); *D04B 1/16* (2013.01); *D04B 1/22* (2013.01); *D04B 1/24* (2013.01); *D04B 21/04* (2013.01); *D04B 21/08* (2013.01); *D04B 21/14* (2013.01); *D06B 1/00* (2013.01); *D06C 7/00* (2013.01); *D06C 13/00* (2013.01); *D10B 2501/043* (2013.01)

(58) Field of Classification Search
CPC . D04B 1/04; D04B 1/24; D04B 21/04; D04B 21/08; D04B 21/14
USPC ......................................................... 700/132
See application file for complete search history.

(56) References Cited

U.S. PATENT DOCUMENTS

| | | | |
|---|---|---|---|
| 1,791,741 A | 2/1931 | Moore | |
| 2,496,631 A | 2/1950 | Leupold et al. | |

(Continued)

FOREIGN PATENT DOCUMENTS

| | | |
|---|---|---|
| CN | 4513042 A | 4/1985 |
| CN | 1301511 A | 7/2001 |

(Continued)

OTHER PUBLICATIONS

Chinese Office Action dated Aug. 19, 2015 in Chinese Patent Application No. 2013800020193.

*Primary Examiner* — Nathan Durham
(74) *Attorney, Agent, or Firm* — Greer, Burn & Crain, Ltd.

(57) ABSTRACT

A method of manufacturing an article of footwear includes providing a knitting machine having a processor programmed to cause the knitting machine to knit a wool pile fabric having a plurality of footwear components and simultaneously knitting wool fibers and a scrim to form the wool pile fabric including the footwear components.

19 Claims, 4 Drawing Sheets

Related U.S. Application Data on Nov. 6, 2012, provisional application No. 61/651,922, filed on May 25, 2012, provisional application No. 61/618,470, filed on Mar. 30, 2012.

(51) Int. Cl.

| | | |
|---|---|---|
| *D04B 1/22* | (2006.01) | |
| *D04B 1/04* | (2006.01) | |
| *D04B 21/04* | (2006.01) | |
| *D04B 21/08* | (2006.01) | |
| *B29D 35/14* | (2010.01) | |
| *D04B 1/24* | (2006.01) | |
| *D04B 21/14* | (2006.01) | |
| *A43B 23/07* | (2006.01) | |
| *D04B 1/02* | (2006.01) | |
| *D01G 21/00* | (2006.01) | |
| *D06C 7/00* | (2006.01) | |

(56) References Cited

U.S. PATENT DOCUMENTS

| | | |
|---|---|---|
| 2,501,435 A | 3/1950 | Caspe |
| 2,587,505 A | 2/1952 | Moody |
| 2,737,702 A | 3/1956 | Schmidt et al. |
| 2,917,807 A | 12/1959 | Scholl |
| 2,941,859 A | 6/1960 | Fein et al. |
| 3,477,803 A | 11/1969 | Fong et al. |
| 3,710,462 A | 1/1973 | Robinson |
| 3,853,680 A | 12/1974 | Daniel |
| 4,026,129 A * | 5/1977 | Sternlieb ............ 66/192 |
| 4,381,655 A | 5/1983 | Trutschel |
| 4,413,997 A | 11/1983 | Milligan et al. |
| 4,415,611 A | 11/1983 | Yamaqata et al. |
| 4,513,042 A * | 4/1985 | Lumb ............ 428/95 |
| 4,636,222 A | 1/1987 | Pfleiderer et al. |
| 4,773,135 A | 9/1988 | Sato et al. |
| 5,141,572 A * | 8/1992 | Gerber ............ 156/64 |
| 5,345,638 A * | 9/1994 | Nishida ............ 12/146 C |
| 5,511,323 A | 4/1996 | Dalgren |
| 5,980,579 A | 11/1999 | Yoon |
| 6,298,275 B1 * | 10/2001 | Herman, Jr. ............ 700/130 |
| 6,330,786 B1 | 12/2001 | Settle |
| 6,434,444 B2 * | 8/2002 | Herman, Jr. ............ 700/135 |
| 6,499,513 B1 * | 12/2002 | Couch ............ 112/470.03 |
| 6,823,569 B2 | 11/2004 | Cohen et al. |
| 7,051,460 B2 * | 5/2006 | Orei ............ A43B 1/00 36/3 A |
| 2005/0193592 A1 | 9/2005 | Dua |
| 2009/0088307 A1 * | 4/2009 | Jelinek et al. ............ 492/29 |
| 2009/0095025 A1 * | 4/2009 | Knight et al. ............ 66/19 |
| 2009/0170677 A1 * | 7/2009 | Knight et al. ............ 492/29 |

FOREIGN PATENT DOCUMENTS

| | | |
|---|---|---|
| CN | 1596326 A | 3/2005 |
| CN | 101010014 A | 8/2007 |
| CN | 101647615 A | 2/2010 |
| CN | 101979760 B | 5/2012 |
| JP | 06-113905 | 4/1994 |

* cited by examiner

SHEARED WOOL WEAVING METHOD

PRIORITY CLAIM

The present non-provisional application claims priority to and the benefit of U.S. Provisional Application No. 61/618,470 filed on Mar. 30, 2012, U.S. Provisional Application No. 61/651,922 filed on May 25, 2012, U.S. Provisional Application No. 61/680,608 filed on Aug. 7, 2012 and U.S. Provisional Application No. 61/722,994 filed on Nov. 6, 2012, each of which are hereby incorporated by reference in their entireties.

BACKGROUND

Conventional footwear includes several parts, such as an upper, a midsole and an outsole, that are attached together by stitching, adhesives or other attachment methods for creating different styles and sizes of footwear. Typically, the uppers are each made by attaching different material components together where the components may include different colors, different patterns and have different performance characteristics. For example, footwear uppers are commonly made by attaching a vamp, opposing left and right side pieces, i.e., quarter pieces, and a heel counter together. These different and various shaped piece parts are laid out and cut from one or more pieces of leather or other material. Although an attempt is made to utilize as much of the material as possible, inevitably, there is a significant amount of waste. Also, the laying out and cutting process is labor intensive.

Accordingly, there is a need for a method of manufacturing footwear that improves manufacturing efficiency and reduces material waste.

BRIEF SUMMARY

The present disclosure provides a method of manufacturing footwear or other products from a wool pile fabric that significantly improves manufacturing efficiency and reduces material waste.

In an embodiment, a method of manufacturing an article of footwear or other product includes providing a knitting machine having a processor programmed to cause the knitting machine to simultaneously knit a sliver of wool fibers and a scrim yarn to form the wool pile fabric, the processor controlling the knitting machine to knit a plurality of discreet product components of wool pile on the scrim.

In another embodiment, a method of manufacturing an article of footwear includes providing a knitting machine having a processor programmed to cause the knitting machine to knit a wool pile fabric having a plurality of discrete footwear components, and automatically marking each of the footwear components with a component indicator.

In yet an embodiment, a method of manufacturing a multi component product includes providing a knitting machine having a processor programmed to cause the knitting machine to simultaneously knit fibers with a scrim to form a pile fabric, the processor controlling the knitting machine to knit a plurality of discreet product components of pile on the scrim, each component have a predetermined fiber density.

DETAILED DESCRIPTION

Various embodiments of the invention are described below by way of example only, with reference to the accompanying drawings. The drawings include figures that may not be to scale, which will be fully understood by skilled artisans with reference to the accompanying description. Features may be exaggerated for purposes of illustration. From the preferred embodiments, artisans will recognize additional features and broader aspects of the invention.

The present disclosure provides a method of manufacturing footwear or other products from a predominantly wool pile fabric. The pile fabric is preferably formed as described in commonly owned U.S. patent application Ser. No. 13/838,551, filed Mar. 15, 2013 and entitled "Natural Wool Pile Fabric and Method for Making Wool Pile Fabric," which application is hereby incorporated by reference in its entirety. The method of the present disclosure significantly improves manufacturing efficiency and reduces material waste.

Figure 1:
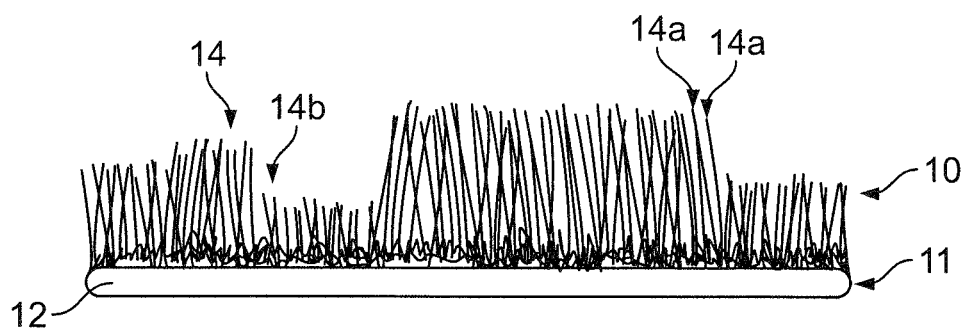
FIG. 1 is a front elevational view of the wool pile fabric including wool fibers having different lengths and densities.

Referring now to the accompanying drawings, in an embodiment of the method, sheared wool 10 is processed, i.e., cleaned, carded, slivered, and knitted, woven or otherwise secured to a base material 11 such as a textile scrim 12. The scrim 12 may be any suitable material or combination of materials such as a natural or synthetic fiber yarn. In a preferred embodiment, sheared wool fibers 14, alone or mixed with other non-wool fibers, are simultaneously knit with scrim yarn using a conventional tubular or circular knitting machine Other knitting, weaving or non-woven textile process can be used in lieu of tubular knitting. As shown in FIG. 1, the sheared wool fibers 14 may include fibers having different lengths and densities, e.g., including fibers having different lengths or heights. Also, the number of fibers in a particular area or areas on the base material 12, i.e., the fiber density, may be uniform or may vary along a length, a width or in any suitable pattern on the base material. Also, non-wool fibers such as natural or synthetic fibers for controlling odor can be combined with the wool fibers. Such non-wool fibers may be mixed with the wool fibers prior to knitting, i.e., a fiber sliver fed to the knitting machine may comprise a mixture of fiber types. Alternatively, a plurality of slivers can be fed to the knitting machine each sliver containing a different fiber type or a different mix of fibers, and the knitting machine can be programmed to knit different, predetermined areas with different fibers or different fiber mixes.

Figure 2:
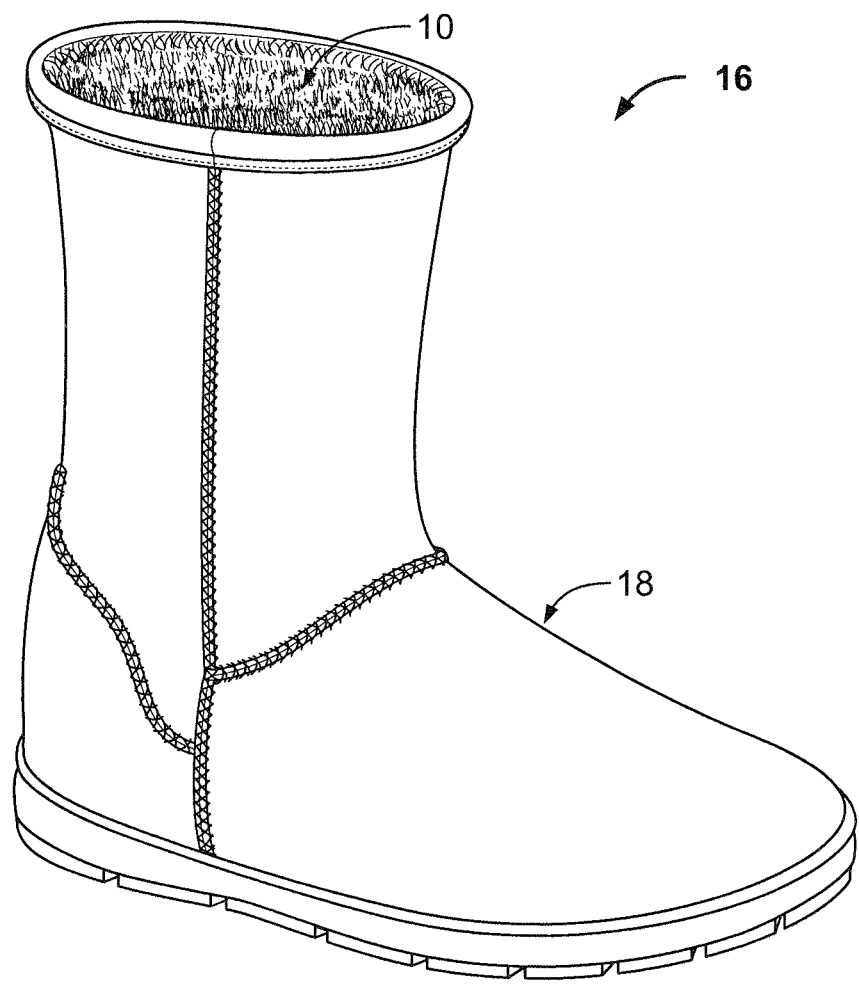
FIG. 2 is a perspective view of a known article of footwear.
Figure 3:
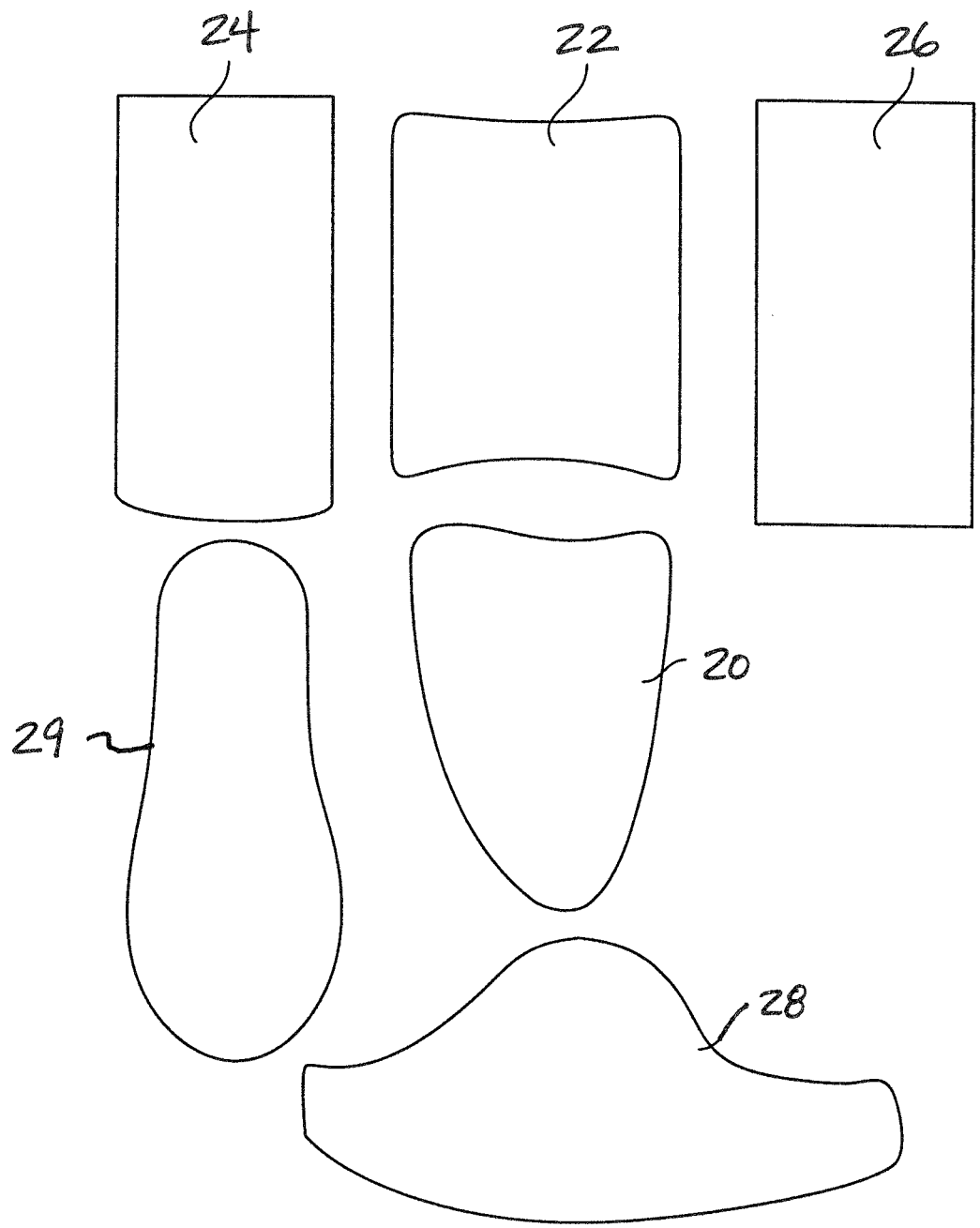
FIG. 3 is a top view of a plurality of components used to make the article of footwear of FIG. 2.

FIGS. 2 and 3 show an example of a conventional sheepskin boot 16 where the boot comprises several parts that are attached together, typically by sewing. Each component of the boot is cut from a sheepskin hide. The sheepskin is desirably and conventionally "twin face" sheepskin, i.e., one side is a smooth, tanned leather and other side is natural wool fleece. Color and consistency varies from hide to hide, so it is desirable to make a pair of boots from a single hide. Further, natural sheepskin hides are irregularly shaped, are not uniform and frequently include imperfections. Accordingly, a skilled leather worker is needed to layout and mark each component on the hide. Each component is then cut and attached together to form an upper of the boot.

FIG. 3 illustrates the different piece part components of an upper 18 prior to assembly. In particular, the components include a front portion or vamp 20, a front panel 22, a left side quarter panel 24, a right side quarter panel 26 and a heel portion 28. It should be appreciated that the heel portion 28 may alternatively be made from leather, synthetic leather, or another non-sheepskin material. The boot may also include a footbed or insole 29. Each of these components is typically manually marked and cut from a sheepskin hide using a component cutter (similar to a cookie cutter). Each component has a particular, predetermined size and shape depending on various factors including shoe/boot style and size. A skilled leatherworker is required to layout each component on a given hide to maintain quality (some components are more visible than others) and to minimize waist. Regardless of the skill of the leatherman, there are considerable inherent inefficiencies and material waste.

Figure 4:
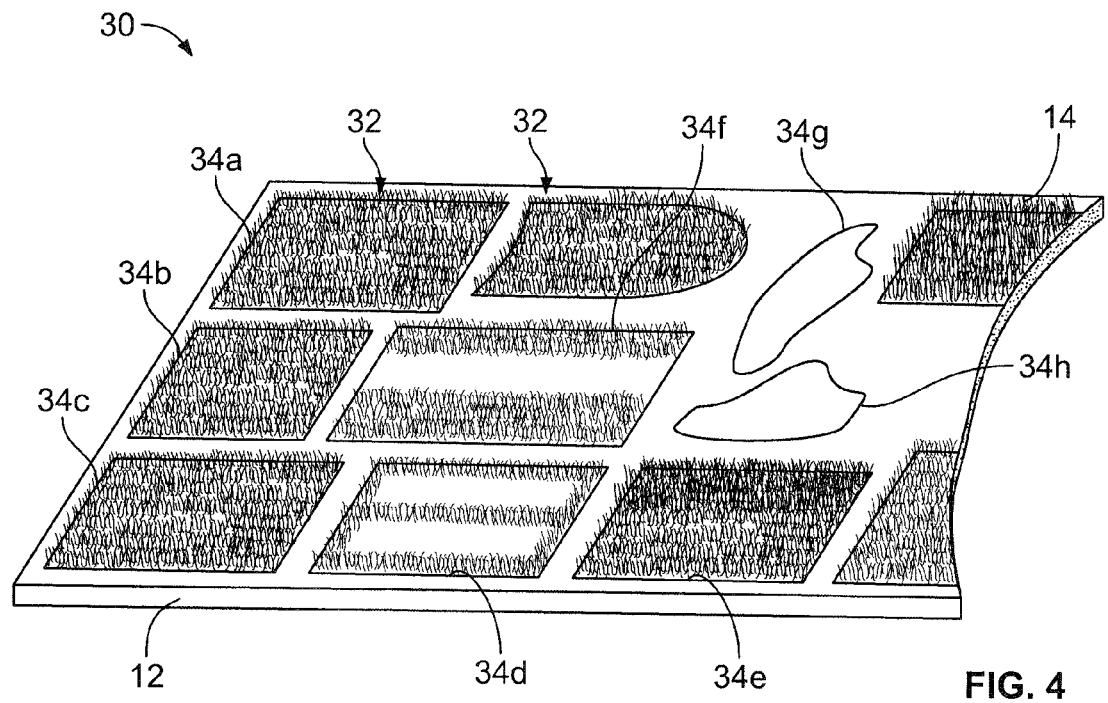
FIG. 4 is a fragmentary perspective view of a wool fiber side of a wool pile fabric including multiple footwear components.
Figure 5:
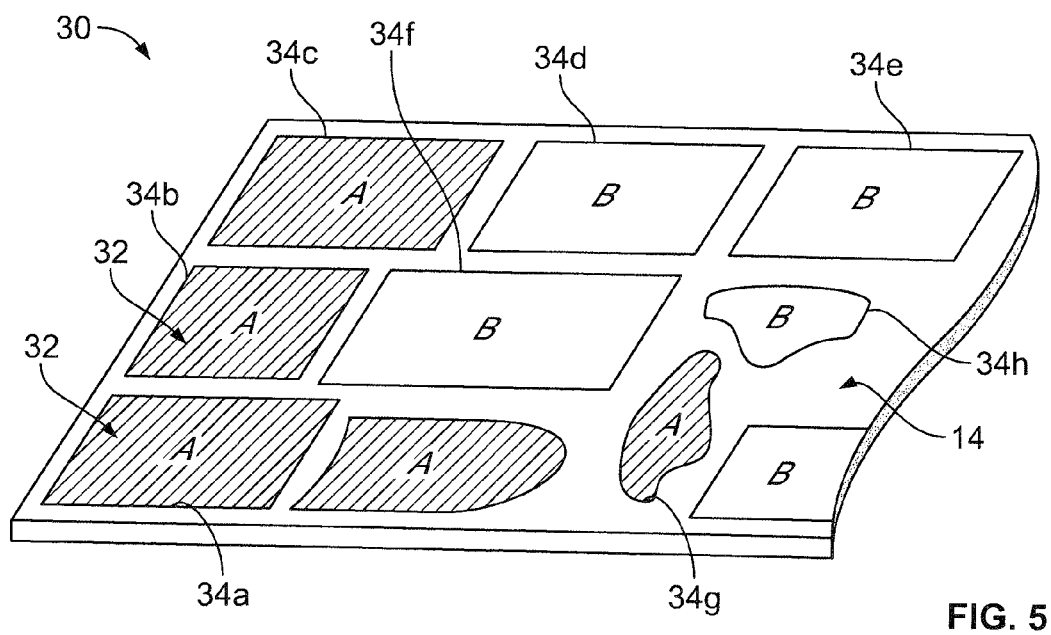
FIG. 5 is a fragmentary perspective view of a scrim side of the wool pile fabric of FIG. 4 showing the indicators marked on the footwear components.

In accordance with the process of the present invention, efficiencies are improved and material waste is greatly reduced. The process of the invention can be used to manufacture a wide variety of textile based products, including apparel and footwear. Referring now to FIGS. 4 and 5, a pile fabric such as sheared wool pile fabric sheet 30 is manufactured in a continuous process. Although any type of fabric forming process can be used, including knitting, weaving and non-woven, a preferred fabric forming process is tubular or circular knitting. A conventional tubular knitting machine has multiple material feeds that knit one or more yarns to form a unitary, tubular fabric. The knitting process can be used to make unitary or component footwear uppers having different areas or regions having different material properties. Knitting and other similar technologies are described in U.S. Pat. Nos. 2,314,098; 5,345,638 and 6,931,762, all which are hereby incorporated herein by reference.

The pile fabric predetermined dimensions such as a designated width. The pile fabric sheet or wool pile fabric 30 includes a base material or scrim 12 and wool fibers 14 that are simultaneously knit with the scrim. The knitting machine includes a processor that can be programmed to simultaneously knit one or more fibers to a scrim to form a pile fabric. More specifically, the processor can be programmed to knit different stitches, and combine one or more fibers or different color fibers in predetermined areas or patterns. The processor can also be programmed to knit different fiber densities in different areas, regions or patterns on the base scrim. The processor can also be programmed to control the knitting machine to knit non-pile, knit fabrics in designated areas or regions of the scrim sheet. In this embodiment, the processor may be a computer, programmable controller, or other computing device having a processor.

To enhance manufacturing efficiency, each of the components 32 for an article of footwear such as a single pair of shoes or boots, or alternatively for several pairs of shoes or boots, are simultaneously knit with the scrim 12 in specific designated areas on a fabric sheet 30. It should be appreciated that the discrete components 32 may all be the same component, such as boot shaft pieces, or plural different components, such as shaft and vamp pieces, or wider variety of different components.

Referring now to FIG. 4, a wool pile fabric embodiment is shown wherein the base scrim comprises a number of discrete components 32. Some components have uniform fiber density, such as components 34a, 34b and 34c. Other components have different fiber densities such as component 34d, different lengths such as component 34e, or different patterns such as components 34d and 34f. The components 32 may also be manufactured with no fibers or negligible fibers such as components 34g and 34h. The present manufacturing method therefore enables knitting of the sheared wool fibers 14 to the scrim 12 so that one or more portions of the scrim include fibers having the same length, density, pattern and/or color, or fibers having different lengths, densities, patterns and/or colors. Thus, components for the same footwear or apparel style, or different styles may be knitted and formed on a single piece or a roll of the wool pile fabric.

FIG. 5 shows the scrim side or non-fiber side of the wool pile fabric or wool pile fabric product of FIG. 4. As shown, each component has been marked, such as with the letters "A" and "B," to identify the components 32 associated with a particular article of footwear. For example, the components marked with the letter "A" may be for the left foot, while the components marked with the letter "B" are for the right foot. Alternatively, the components marked with the letter "A" may be for a footwear style "A" and the components marked with the letter "B" may be for a footwear style "B." The components 32 for a designated footwear or footwear style may be identified using letters, numbers, colors or any suitable identifier or indicator. Furthermore, the non-fiber side of the components may include the name, item or product number of the footwear style or any other suitable identifier or indicator. For example in FIG. 5, the components 34g and 34h of the different footwear styles "A" and "B" include different colors or different color shades to indicate that those components belong to a specific footwear style or styles. It should be appreciated that the fabric, and more specifically, the scrim side of the fabric may be marked with a plurality of indicators where each indicator identifies a different component. The indicators may also identify each of the components, identify two or more of the same components or any suitable number of the components.

Figure 6:
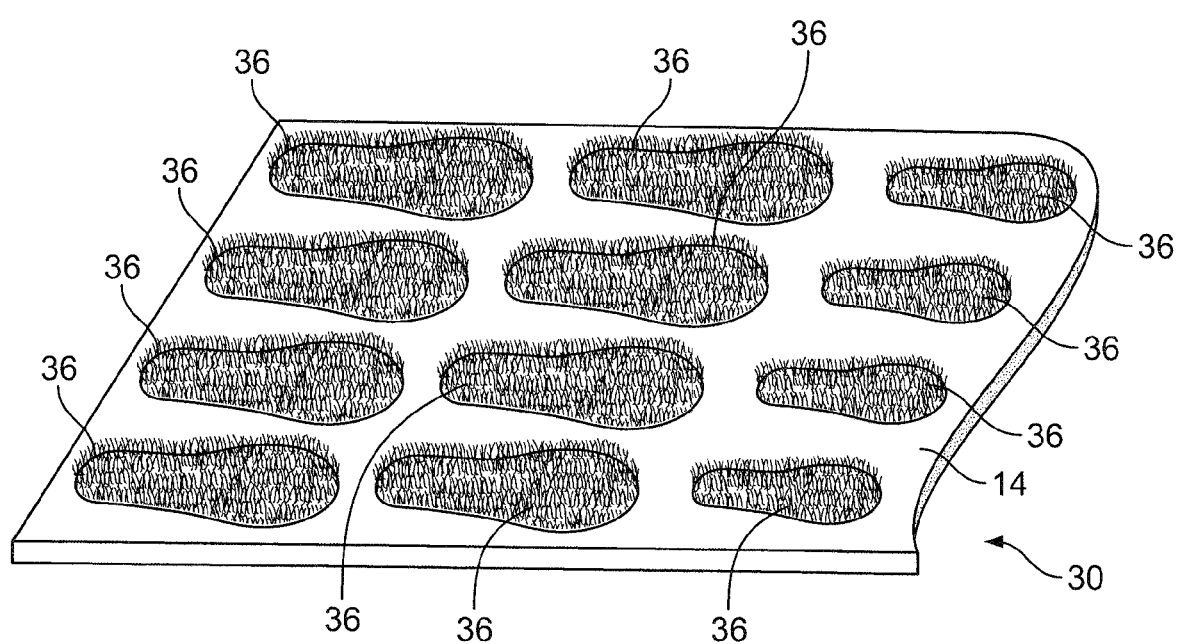
FIG. 6 is a fragmentary perspective view of another embodiment of a wool fiber side of a wool pile fabric including multiple footwear components.

FIG. 6 shows another embodiment where multiple units of a single product component are knit to the scrim. More specifically, multiple discrete insoles 36 are knit to the scrim. Each insole may have uniform fiber length and density, or the density may vary, e.g., greater fiber density in the heel of each insole. Likewise, the fibers may comprise all wool, or may comprise a mixture of fibers, e.g., wool and odor controlling fibers. Further, each insole may have different regions, e.g., a dense wool fiber pile in the heel and less dense blend of wool and odor controlling fibers in the forefoot. Each insole may also be the same size or different sizes as shown in FIG. 6. Optionally, a length of fabric may comprise multiple units of the same size and shape outsole, or left and right outsoles, or multiple size outsoles.

It is contemplated that the wool pile fabric 30 may include components 32 from the same product, such as a shoe or shoes, or different products such as shoes, coats and hats.

After the components 32 are marked on the wool pile fabric 30, the components are cut from the fabric using manual cutting or machine cutting or stamping. It should be appreciated that the marked components 32 may be cut or removed from the wool pile fabric 30 using any suitable cutting method. In this regard, the components may be automatically cut by one or more machines to remove the footwear components from the fabric. After cutting the components, the components are assembled into at least one article of footwear based on the indicators on the components. Since only the areas intended for use in products are knitted with wool or other fiber pile, and/or comprise high quality yarns, waste is greatly reduced. Waste is essentially limited to the inexpensive scrim between components.

The present manufacturing method described in the above embodiments improves manufacturing efficiency and helps to reduce material waste by efficiently marking product components for one or more products, styles or models, such as footwear or apparel components, on a continuous length of pile fabric.

While a particular embodiment of the present manufacturing method has been described herein, it will be appreciated by those skilled in the art that changes and modifications may be made thereto without departing from the invention in its broader aspects.

What is claimed is:

1. A method of manufacturing a product, comprising:
   providing a knitting machine having a processor,
   feeding a sliver of fibers to the knitting machine, the sliver being solely comprised of wool fibers,
   programming the processor to control the knitting machine to simultaneously knit the fibers and a scrim yarn to form a pile fabric having a scrim side and a fiber pile side, wherein said programming step includes instructions to knit at least three discrete, separated and different product components comprised of fiber pile for at least two different product styles, and
   knitting a fabric comprising a length of scrim having said at least three fiber pile product components for the at least two different product styles.

2. The method of claim 1, wherein the components are different sizes.

3. The method of claim 1, wherein the components include fibers having a uniform density.

4. The method of claim 1, wherein the components include fibers having different lengths.

5. The method of claim 1, wherein the scrim comprises wool and non-wool fibers.

6. The method of claim 1, further comprising marking the scrim side of the fabric, at a location opposite each component with indicators identifying each respective component.

7. The method of claim 6, wherein the indicator associated with each of the components identifies a footwear style.

8. The method of claim 1, wherein the fabric includes spaces between components that lack wool fiber pile.

9. The method of claim 1, wherein the product components are footwear components.

10. The method of claim 1, further comprising:
    cutting and removing the components from the wool pile fabric; and
    assembling an article of footwear using the components cut from the fabric.

11. A method of manufacturing an article of footwear comprising:
    providing a knitting machine having a processor programmed to cause the knitting machine to knit a wool pile fabric having at least three discrete, separated and different footwear components for at least two different footwear styles;
    simultaneously knitting wool fibers and a scrim yarn to respectively form a fiber side and a scrim side of the wool pile fabric including the footwear components, wherein the fiber side includes only wool fibers; and
    automatically marking the scrim side of each of the footwear components with a component indicator that indicates the footwear components belonging to each of the at least two footwear styles.

12. The method of claim 11, further comprising:
    cutting and removing the components from the wool pile fabric; and
    assembling at least one article of footwear based on the markings on the footwear components cut from the wool pile fabric.

13. The method of claim 11, wherein automatically marking the components includes marking the components with an indicator that identifies each of the components.

14. The method of claim 11, wherein automatically marking the components includes marking the components with an indicator that identifies at least two different components.

15. A method of manufacturing a multi-component product comprising:
    providing a knitting machine,
    feeding a sliver of fibers to the knitting machine, the sliver being solely comprised of wool fibers,
    controlling the knitting machine to simultaneously knit the fibers and a scrim yarn to form a pile fabric having a scrim side and a fiber pile side, the pile fiber side having at least three separated and different product components of pile for at least two different product styles on the scrim, each component having a predetermined fiber density, and
    knitting a fabric comprising a length of scrim having said at least three product components for said at least two different product styles.

16. The method of claim 15, wherein different ones of said component have different fiber densities.

17. The method of claim 15 wherein for at least at least a portion of said components, each component has different areas having different fiber density.

18. The method of claim 15, wherein the scrim comprises wool and non-wool fibers.

19. The method of claim 15 wherein the product is footwear, and the components are footwear components.

* * * * *